O. W. STOW & A. BARNES.

Candle Snuffers.

No. 4,841. Reissued April 2, 1872.

Witnesses.

F. L. Chapin

F. S. Hourgerford

Inventors.

Orson W. Stow

Augustus Barnes

By James Shepard Atty

UNITED STATES PATENT OFFICE.

ORSON W. STOW AND AUGUSTUS BARNES, OF SOUTHINGTON, CONNECTICUT, ASSIGNORS TO THE PECK, STOW & WILCOX CO., OF SAME PLACE.

IMPROVEMENT IN SNUFFERS.

Specification forming part of Letters Patent No. 18,713, dated November 24, 1857; extended seven years; reissue No. 4,841, dated April 2, 1872.

*To all whom it may concern:*

Be it known that we, ORSON W. STOW and AUGUSTUS BARNES, of Southington, in the county of Hartford and State of Connecticut, have invented certain new and useful Improvements in Candle-Snuffers, of which the following is a specification:

Our invention consists of the improved candle-snuffers struck up from two pieces of sheet metal, and of the peculiar construction of the wing part and handle, as hereinafter described.

Figure 1:
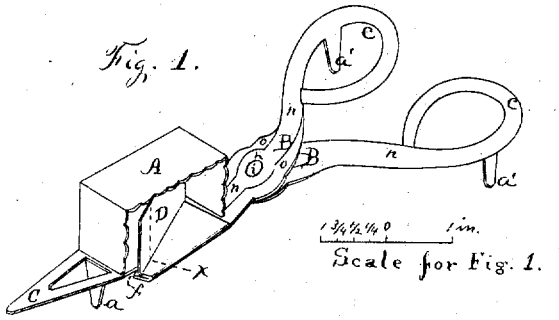
Figure 2:
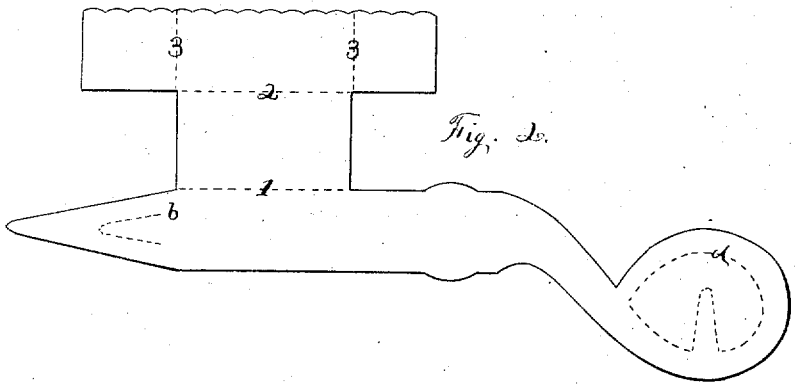
Figure 3:
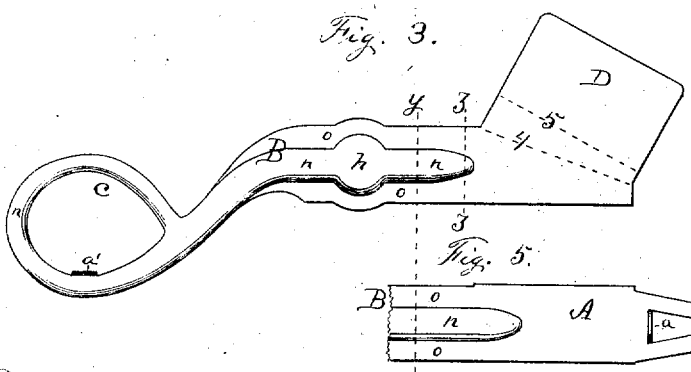
Figure 4:
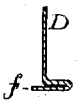
Figure 5:
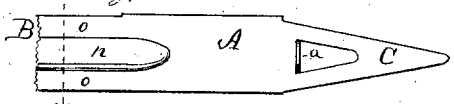
Figure 6:
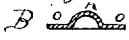
Figure 7:
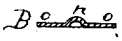
Figure 8:
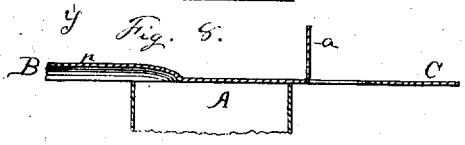

In the accompanying drawing, Figure 1 is a perspective view of a pair of snuffers embodying our invention. Fig. 2 is a plan view of the blank from which one half of said snuffers is formed. Fig. 3 is a plan view of the blank for the wing or other half, the handle thereof being swaged. Fig. 4 is a vertical section of the wing on the line *x*, Fig. 1. Fig. 5 is a plan view of a portion of the handle and bowl, showing that the central bead in the handle vanishes at the bowl. Figs. 6 and 7 are transverse sections of the handle on lines *y y* and *z z*, respectively; and Fig. 8 is a central longitudinal section of a portion of the handle and its bowl.

Our improved snuffers are composed of two pieces only, each of which is cut from sheet metal by means of dies. The bowl A and handle B are blanked out in the form shown in Fig. 2. The front leg *a* is cut from the point C, on the broken line *b*, Fig. 2. The other legs *a' a'* are cut from inside of the bows *c c*, as indicated by the broken lines *d*, Fig. 2. The bow *c* and the handle B are then swaged or struck up in a die which will form the central corrugation or hollow ridge *n*. The bowl is formed by bending the blank, Fig. 2, on the line 1 until the bent portion is perpendicular to the body of said blank; then again on line 2, which will form the top of the bowl A, when the ends of said top are bent downward on the lines 3 3, when the bowl A is complete, as shown in Fig. 1. The wing D is blanked out in the form shown at the right in Fig. 3, and the blank for its handle B similar to that shown in Fig. 2. The wing portion of the blank is folded over on broken line 4, and then bent up perpendicular on the broken line 5, when it is in the form shown in Figs. 1 and 4. By this construction of the wing the sharp edge of the sheet metal forms the cutting-edge *f*, and the wing D projects upward from near said edge.

On each of the handles B B the central corrugation *n* is enlarged, as at *h*, and projects upward in one handle and downward in the opposite handle, so that when the two parts are placed together a recess is formed in which an ordinary snuffer-spring may be placed, if desired, to hold the blades closed when not in use. A rivet, *i*, Fig. 1, passes through the two handles B B and secures them together, when the device is complete.

The central corrugation or hollow ridge *n* extends lengthwise through the handle B. In the handle of the bowl part, Figs. 5 and 8, this corrugation vanishes at the bowl by tapering —that is, contracting both sidewise and flatwise, in contradistinction to spreading sidewise. In the handle of the wing part, Fig. 3, this vanishes in the broad portion of the handle near the wing.

On each side of the corrugation *n* is a band, *o*, clearly shown in the sectional views Figs. 6 and 7. This band *o* may gradually taper and vanish, as it reaches the bow or the end of the handle opposite the bowl, but the corrugation continues until it reaches the bow *c*, at which point it branches or divides into two hollow ridges or corrugations, as shown in Figs. 1 and 3.

This form for a sheet-metal handle possesses great advantage over others by being strengthened in every direction—the corrugation strengthening the handle vertically, and the bands *o o* laterally. The bands *o o* are omitted at the bows *c c*, said parts being sufficiently strong without them; but the bands are useful in the straight portion of the handle B B, in order to give them the necessary lateral strength to sustain all the uses that they may be subjected to; thus the handles, although constructed of sheet metal, are sufficiently strong to be used for all the ordinary purposes of such handles.

The peculiar construction of the bead, contracting in both directions, as shown and described, enables us to extend the bead a short distance into the bowl, and thereby give great strength to the handle at the point of junction with the bowl, where a fracture is most common, and which point cannot be thus strengthened by a bead which vanishes by spreading sidewise.

We claim as our invention—

1. The herein-described candle-snuffer, constructed of two pieces of sheet metal, struck up into form, substantially as and for the purpose described.

2. The peculiar construction of the wing D, bent, as shown and described, so as to form a good cutting-edge, and allow the wing to project upward near said edge.

3. The sheet-metal handle, having a central corrugation or hollow ridge, which extends longitudinally with said handle, and vanishes at the bowl by tapering both sidewise and flatwise, substantially as before set forth.

ORSON W. STOW.
AUGUSTUS BARNES.

Witnesses:
JOHN GRIDLEY,
W. S. MERRILL.